(No Model.)
W. H. VIBBARD & G. H. CHANDLER.
SEWER FLUSHING APPARATUS.
No. 262,860. Patented Aug. 15, 1882.
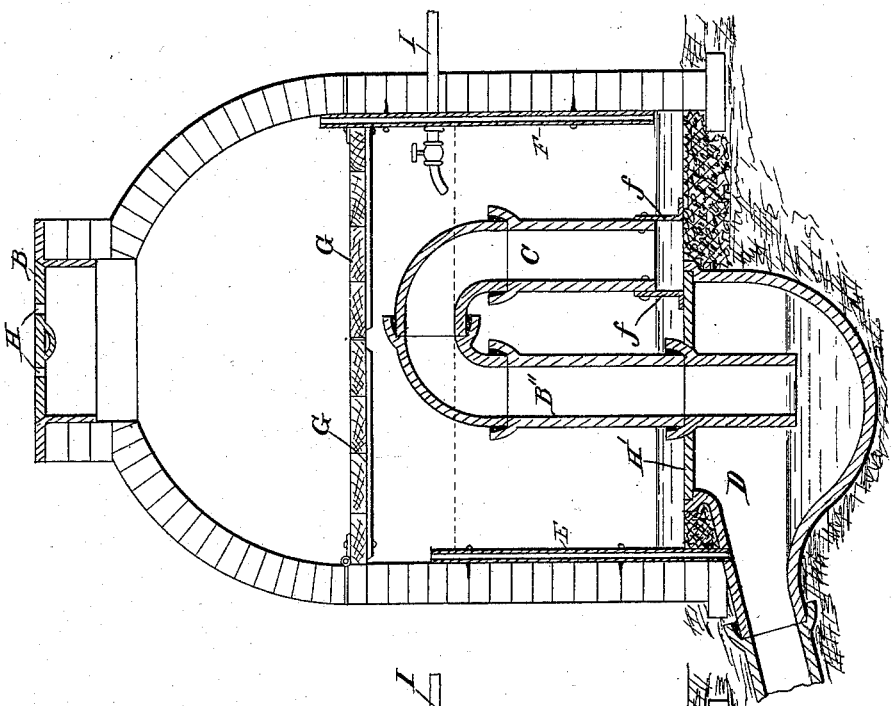
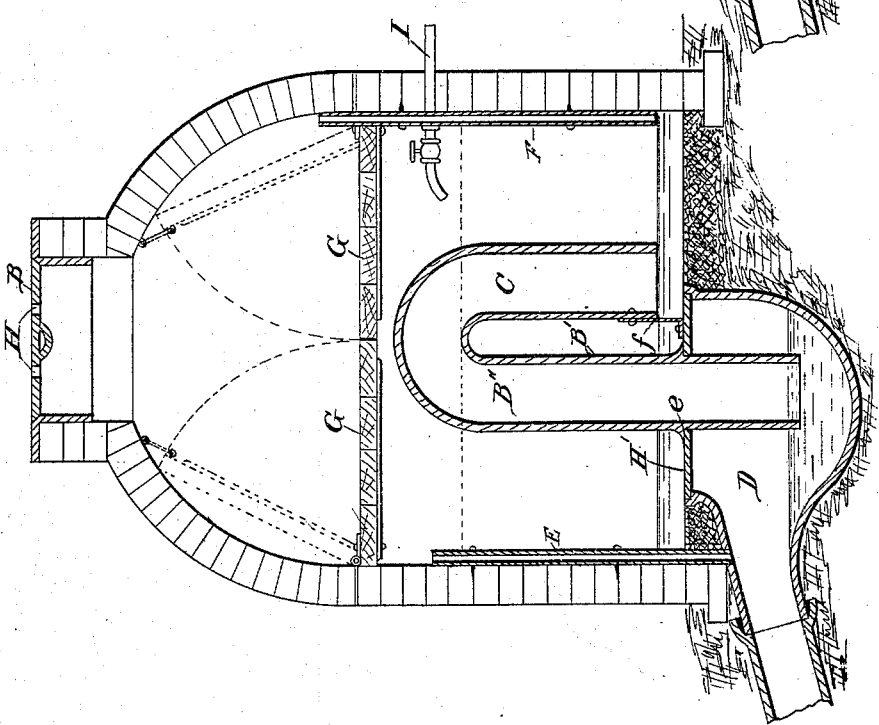
Witnesses:
A. P. Robertson
A. Harry Semmes
Inventors:-
Wm. H. Vibbard
Geo. H. Chandler
By T. J. W. Robertson
Attorney.

UNITED STATES PATENT OFFICE.

WILLIAM H. VIBBARD AND GEORGE H. CHANDLER, OF KALAMAZOO, MICHIGAN; SAID CHANDLER ASSIGNOR TO SAID VIBBARD.

SEWER-FLUSHING APPARATUS.

SPECIFICATION forming part of Letters Patent No. 262,860, dated August 15, 1882.

Application filed June 9, 1882. (No model.)

*To all whom it may concern:*

Be it known that we, WILLIAM H. VIBBARD and GEORGE H. CHANDLER, citizens of the United States, residing at Kalamazoo, in the county of Kalamazoo and State of Michigan, have invented certain new and useful Improvements in Sewer-Flushing Apparatus, of which the following is a specification, reference being had therein to the accompanying drawings.

This invention relates to an improved device for automatically flushing sewers at regulated intervals; and it consists in the peculiar construction, arrangement, and combination of the various parts, as more fully hereinafter described and claimed.

In the accompanying drawings, Figure 1 represents a vertical sectional view of our improvement, and Fig. 2 a similar view, showing slight differences in construction.

A represents a tank situated at the head of a sewer or at any other suitable point. It is preferably of circular form, and is provided at the top with a cover, B, having one or more holes, H, and at the lower end with a trap, D, whose upper edge is set in cement at a level with the base of the tank. The upper edge of this trap D is provided with a flanged seat to receive a plate, H', which has an opening for the pipe B', which passes centrally through it, and is provided with a flange, e, to support it at a proper height, its lower end projecting into the trap sufficiently to form a water-seal in the latter. The pipe B forms one end of a siphon, B'' C, which extends upward in the tank, and whose other end is supported a short distance above the base of the tank by brackets or legs f. Just above the siphon are arranged two doors, G G, which are hinged one to each side of the tank and are arranged in a suitable frame, which, with the doors, entirely closes the tank. These doors should be used in cold weather to prevent the water in the tank from freezing; but they may be opened, as represented by dotted lines in Fig. 1, and kept open by suitable fastenings at their loose ends.

E represents a tube placed at one end of the tank and extending from the trap to a point above the level of the inner surface of the siphon. This tube, by allowing admission of air from its upper end into the trap D, prevents the water from being so far drawn out as to unseal said trap by siphoning, so as to always preserve a water-seal for the lower end of the siphon. The tube also allows the atmosphere to follow after the flow of water discharged, preventing any back-draft of vacuum in the tank. When the holes H in the cover are closed with snow, ice, or mud the air in the main will rise up the tube E and allow the siphon to work the same as if the holes were open.

F is an additional tube extending above the frost-doors and to a level with the opening in the short leg of the siphon. The object of this tube is to supply air when the frost-doors are closed and the holes in the cover open.

I represents a water-pipe, which gives the proper supply of water.

In Fig. 1 of the drawings the trap D, the plate H', and the siphon B'' C are represented as they are constructed when made of iron; but all of the parts named may be made of terra-cotta or other similar material, if desired. When made of terra-cotta the parts are preferably made in the form shown in Fig. 2, in which the siphon is represented as being made of several sections, which should be properly cemented together.

When iron is used in the construction of the device the trap may be made with a square top, and when terra-cotta is the material used it may be made of a circular form, although either or any other form may be used with either, if found desirable.

The operation of the device is as follows: The water from the pipe I gradually rises in the tank until it reaches the level of the interior of the bend of the siphon, when it immediately passes over the bend, down the long leg of the siphon, and out into the sewer-pipe, the suction caused by the passage of the water in the long pipe causing the water in the tank to continue to flow rapidly through the siphon until it reaches a level below the short leg of the siphon, when the entrance of air into the siphon prevents further flow of water. As soon as the action of the siphon stops the water in the tank gradually rises again and repeats the action just described, the operation being repeated as long as water is supplied, and the rapidity of the operation being governed by the amount of water admitted, which can be governed by the cock.

We are aware that it is not new to use siphons for flushing sewers, and we do not therefore broadly claim the use of siphons for the purpose specified.

What we claim is—

1. The combination, with the tank A, of the siphon B″ C, the trap D, inclosing the long leg of the siphon, and the tube E, leading from the trap to the tank, substantially as described, and for the purpose specified.

2. The combination, with the siphon B″ C and tank A, of the frost-doors G G, hinged to the tank at a point above the siphon, substantially as and for the purpose specified.

3. The combination, with the tank A, trap D, and plate H, of the curved siphon B″ C, having a flange, $f$, on its long leg to rest on the plate H, and means for supporting the short leg of said curved siphon above the said plate H, substantially as described.

4. The combination, with the tank A, siphon B″ C, and frost-doors G G, of the air-tube F, opening above and below the doors, substantially as and for the purpose specified.

In testimony whereof we affix our signatures in presence of two witnesses.

WILLIAM H. VIBBARD.
GEORGE H. CHANDLER.

Witnesses:
LYMAN M. GATES,
GUSTAVUS M. GATES.